(12) United States Patent
Kanno

(10) Patent No.: US 9,891,392 B2
(45) Date of Patent: Feb. 13, 2018

(54) OPTICAL CONNECTOR

(71) Applicant: FUJIKURA LTD., Tokyo (JP)

(72) Inventor: Shuhei Kanno, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/344,783

(22) Filed: Nov. 7, 2016

(65) Prior Publication Data

US 2017/0139157 A1 May 18, 2017

(30) Foreign Application Priority Data

Nov. 16, 2015 (JP) ................................. 2015-223838

(51) Int. Cl.
*G02B 6/36* (2006.01)
*G02B 6/38* (2006.01)

(52) U.S. Cl.
CPC ......... *G02B 6/3893* (2013.01); *G02B 6/3821* (2013.01); *G02B 6/3825* (2013.01); *G02B 6/3887* (2013.01)

(58) Field of Classification Search
CPC .................................................... G02B 6/3898
See application file for complete search history.

(56) References Cited

U.S. PATENT DOCUMENTS

| | | | | |
|---|---|---|---|---|
| 7,871,203 B2* | 1/2011 | Iwaya | ................... | G02B 6/3879 385/55 |
| 8,559,781 B2 | 10/2013 | Childers et al. | | |
| 9,103,996 B2* | 8/2015 | Lin | ....................... | G02B 6/3898 |
| 9,151,907 B2* | 10/2015 | Jiang | .................... | G02B 6/3893 |
| 2011/0019962 A1* | 1/2011 | Childers | .............. | G02B 6/3869 385/76 |
| 2012/0093467 A1* | 4/2012 | Mullady | .............. | G02B 6/3897 385/89 |
| 2013/0183004 A1* | 7/2013 | Hughes | .................. | G02B 6/241 385/77 |
| 2015/0078717 A1 | 3/2015 | Lin | | |

FOREIGN PATENT DOCUMENTS

| | | |
|---|---|---|
| JP | 2004-20880 A | 1/2004 |
| JP | 2004-233403 A | 8/2004 |
| JP | 2005-17602 A | 1/2005 |
| JP | 2005-62393 A | 3/2005 |

* cited by examiner

*Primary Examiner* — Rhonda Peace
(74) *Attorney, Agent, or Firm* — Osha Liang LLP

(57) ABSTRACT

An optical connector of the disclosure includes: an optical connector body including a housing that houses a ferrule, and a coupling that is movable relative to the housing, the optical connector body being employed to release a latched state by moving the coupling rearward relative to the housing; and a pull member including a pull operation part that is located rearward of the coupling. The pull member includes a pair of side plate parts to be respectively arranged along the side surfaces of the coupling. Each side plate part includes an inner projection that projects inward from an inner surface. The coupling includes a recessed engagement part. The inner projection of the pull member engages with the engagement part of the coupling. When the pull operation part of the pull member is pulled rearward, the coupling is moved rearward relative to the housing by the inner projection of the pull member.

7 Claims, 6 Drawing Sheets

OPTICAL CONNECTOR

TECHNICAL FIELD

The present invention relates to an optical connector.

BACKGROUND ART

When optical connectors are installed in their respective adapters at high densities, an operator may have trouble squeezing his/her fingers between adjacent optical connectors, making attachment/removal of optical connectors difficult. To address this, Patent Literature 1, for example, discloses a configuration wherein a member (sleeve) for facilitating the aforementioned task engages with an optical connector.

CITATION LIST

Patent Literature

Patent Literature 1: U.S. Pat. No. 8,559,781 B2

SUMMARY

In Patent Literature 1, in order to cause the sleeve (corresponding to a pull member) to engage with an outer housing (corresponding to a coupling), an outwardly-projecting part is formed on the outer housing. Unfortunately, this outwardly-projecting part on the outer housing becomes a hindrance when the sleeve is disengaged (i.e., when the optical connector is used without the sleeve).

An objective of the present disclosure is to provide an optical connector having no outwardly-projecting part formed on its coupling.

Solution to Problem

A primary aspect for achieving the aforementioned objective is an optical connector including: an optical connector body including a housing that houses a ferrule, and a coupling that is movable relative to the housing, the optical connector body being employed to release a latched state by moving the coupling rearward relative to the housing; and a pull member including a pull operation part that is located rearward of the coupling. The pull member includes a pair of side plate parts to be respectively arranged along the side surfaces of the coupling. Each of the side plate parts includes an inner projection that projects inward from an inner surface. The coupling includes a recessed engagement part. The inner projection of the pull member engages with the engagement part of the coupling. When the pull operation part of the pull member is pulled rearward, the coupling is moved rearward relative to the housing by the inner projection of the pull member.

Other features are disclosed in the following description and the drawings.

DESCRIPTION OF EMBODIMENTS

Figure 1A:
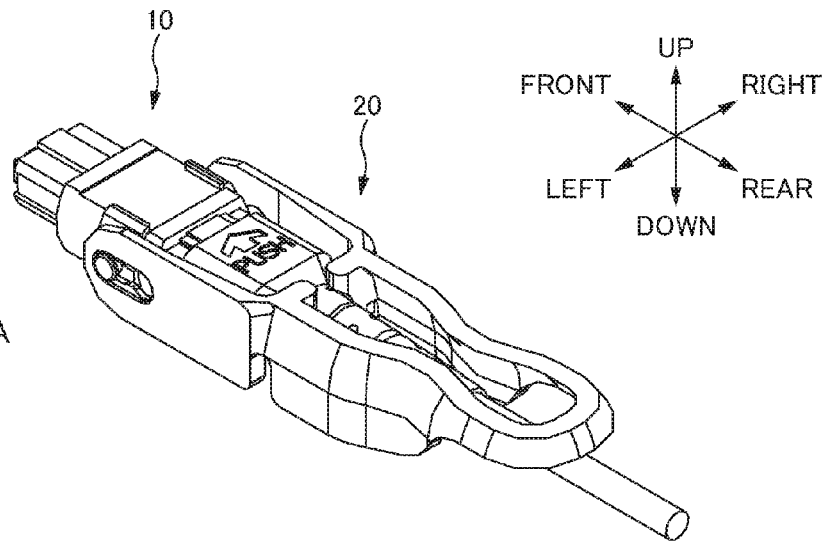
FIGS. 1A and 1B are perspective views illustrating an overall configuration of an optical connector according to an embodiment.

At least the following matters are disclosed in the following description and the drawings.

Disclosed is an optical connector including: an optical connector body including a housing that houses a ferrule, and a coupling that is movable relative to the housing, the optical connector body being employed to release a latched state by moving the coupling rearward relative to the housing; and a pull member including a pull operation part that is located rearward of the coupling. The pull member includes a pair of side plate parts to be respectively arranged along side surfaces of the coupling; each of the side plate parts includes an inner projection that projects inward from an inner surface; the coupling includes a recessed engagement part; the inner projection of the pull member engages with the engagement part of the coupling; and when the pull operation part of the pull member is pulled rearward, the coupling is moved rearward relative to the housing by the inner projection of the pull member.

In this optical connector, the engagement part of the coupling is recessed (i.e., does not project outward), and thus, the engagement part does not become a hindrance even when the pull member is removed. Thus, there is no need to form an outwardly-projecting part on the coupling.

It is preferable that the pull operation part is arranged rearward of a boot that is arranged rearward of the housing of the optical connector body. In this way, the user's fingers can easily reach the pull operation part, and the optical connector body can be unlatched easily, even in cases where optical connectors are installed at high densities.

It is preferable that: the pull member includes a main body part to which the pull operation part is provided, and an attachment to which the side plate parts and the respective inner projections are provided; and the main body part engages with the engagement part of the coupling via the attachment. In this way, the main body part and the attachment can be constructed separately, and the pull member can be attached easily.

It is preferable that: the main body part includes a pair of side wall parts; each of the side wall parts includes a push part that projects inward; and the respective push parts are arranged rearward of a step part of a boot that is arranged rearward of the housing of the optical connector body. In this way, the boot can be pressed from the rear with the push parts by pressing-in the main body part frontward at the time of connecting the optical connector, and the optical connector can be connected with a counterpart optical connector or adapter. Further, by providing the pull member with not only the function as a pull member but also the function as a push member, the optical connector can be attached and detached by operating the same member, which makes the task of attaching/detaching the optical connector easy to understand.

It is preferable that: the attachment includes outer projections that project outward; each of the side wall parts of the main body part includes an engagement hole that engages with the respective outer projection; and when the main body part is rotated by employing the outer projections as an axis, the boot disengages from the push parts arranged rearward of the step part of the boot.

It is preferable that: each of the outer projections includes a head part that cannot pass through the engagement hole, and a neck part that is provided between the head part and the side plate part, is narrower than the head part, and can pass through the engagement hole; each of the side wall parts includes a long hole including said engagement hole and an insertion hole through which the head part is insertable; the neck part of each outer projection is located within the engagement hole in a state where the push parts are arranged rearward of the step part of the boot, and due to contact between the push parts and the step part, the main body part cannot be moved relative to the attachment up to a position where the outer projection reaches the insertion hole; and when the main body part is rotated by employing the outer projections as an axis and the boot disengages from the push parts, the main body part becomes movable relative to the attachment up to a position where the outer projection reaches the insertion hole. In this way, it is possible to prevent inadvertent removal of the main body part, while allowing the main body part to rotate so that the main body part can be disengaged from the outer projections of the attachment.

It is preferable that: each of the side wall parts is provided with a sloped surface; and when a cable extending out from the optical connector body gets bent, the cable or the boot comes into contact with the sloped surface and the main body part rotates. In this way, the main body part can move away from the cable when the cable gets bent, and the cable can be prevented from being subjected to excessive load.

It is preferable that, when the pair of side wall parts is pressed inward, the side wall parts elastically deform and the distance between the push parts is reduced. In this way, the boot can be pressed easily from the rear by the push parts at the time of connecting the optical connector.

First Embodiment

Overall Configuration

Figure 1B:
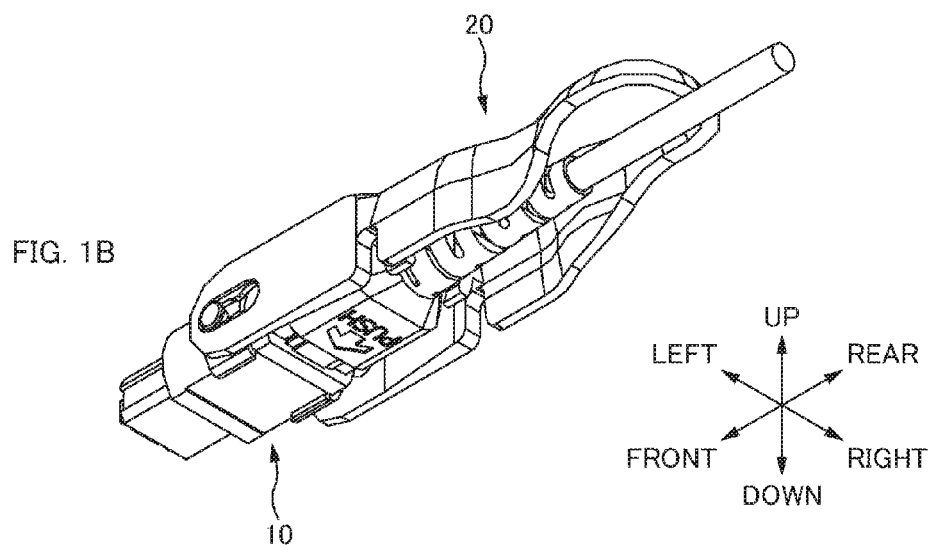
Figure 2:
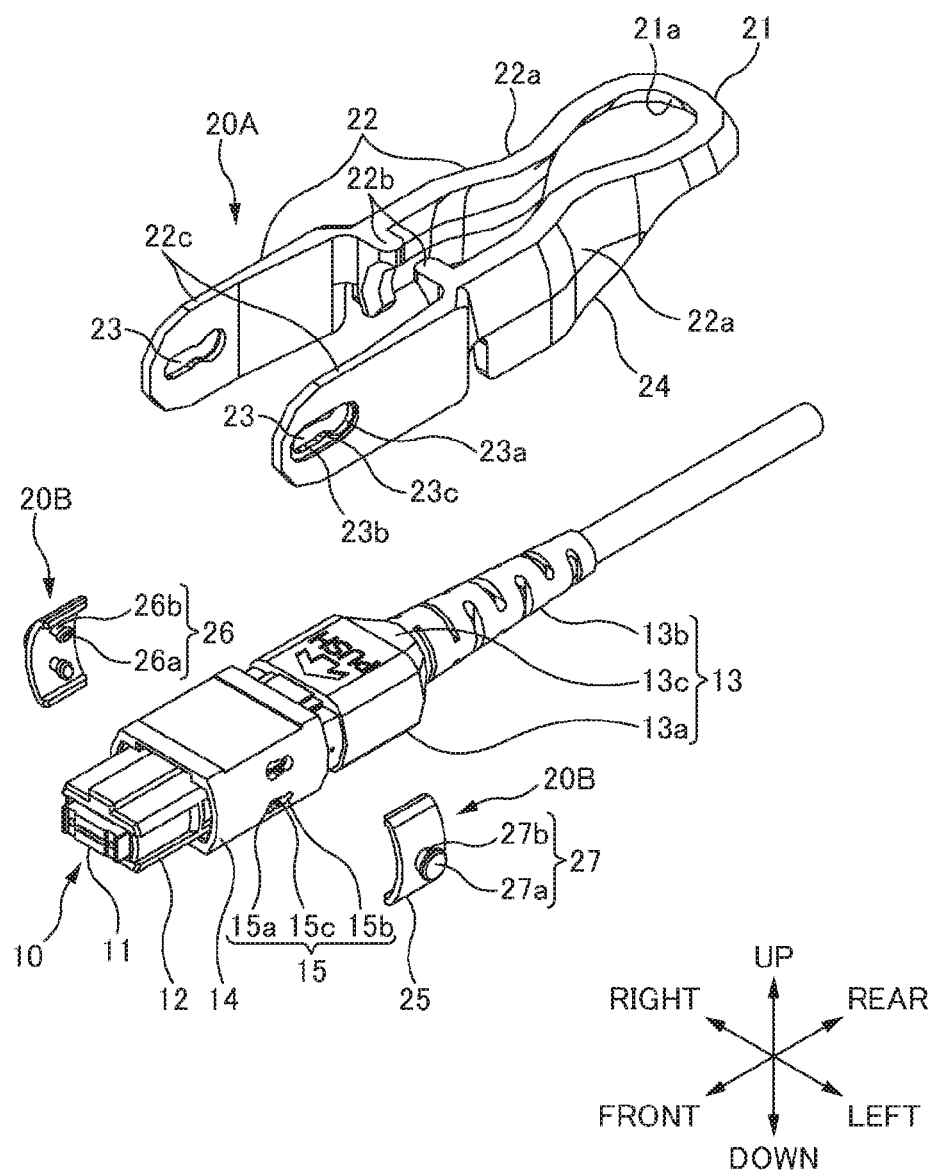
FIG. 2 is an exploded view of a push/pull member 20 of the optical connector of the embodiment.
Figure 3:
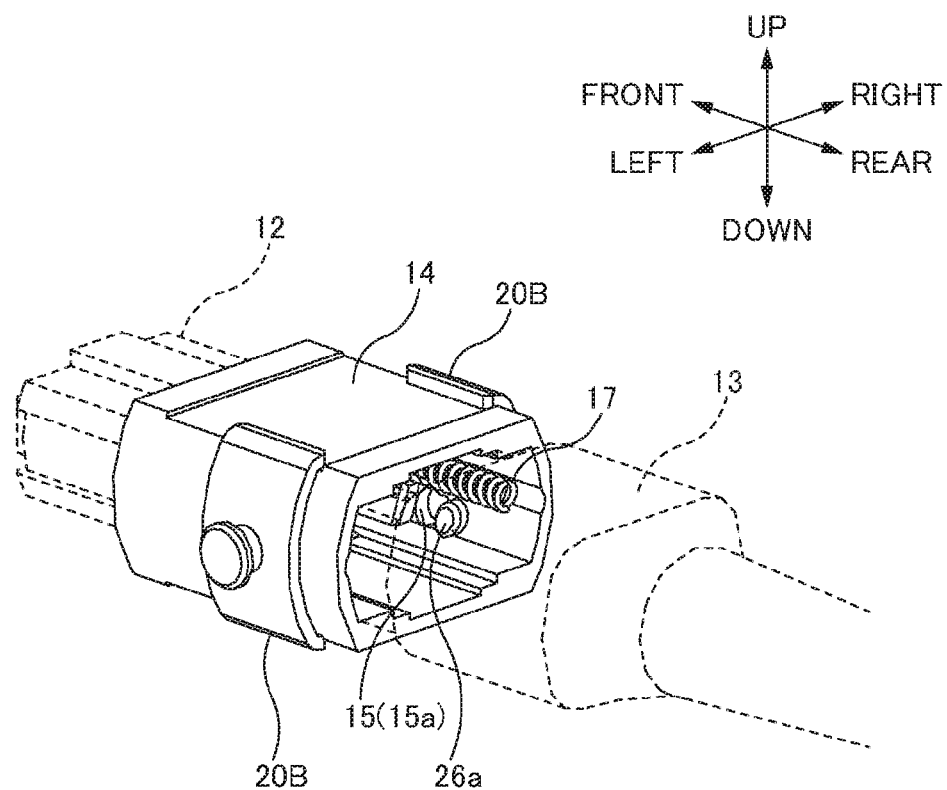
FIG. 3 is a perspective view illustrating a state in which an attachment 20B is attached to a coupling 14.

FIGS. 1A and 1B are perspective views illustrating an overall configuration of an optical connector according to the present embodiment. FIG. 2 is an exploded view of a push/pull member 20 of the optical connector of the present embodiment. FIG. 3 is a perspective view illustrating a state in which an attachment 20B is attached to a coupling 14.

In the description below, the directions illustrated in the figures are defined as follows. The length direction (optical axis direction) of the optical cable is referred to as the "front/rear direction", wherein the housing 12's side where ferrule 11 is provided (i.e., the leading end side of the optical fiber) is the "front", and the opposite side therefrom is the "rear". The direction in which a pair of side wall parts 22 of push/pull member 20 is arranged side by side is referred to as the "left/right direction", wherein the right-hand side as viewed from rear to front is the "right", and the opposite side therefrom is the "left". The direction orthogonal to the "front/rear direction" and the "left/right direction" is referred to as the "up/down direction", wherein the side on which connection part 21 of push/pull member 20 is located relative to the optical cable is "up", and the opposite side therefrom is "down".

The optical connector of the present embodiment includes an optical connector body 10 (a MPO optical connector) and a push/pull member 20 (corresponding to a pull member).

The optical connector body 10 is a Multifiber Push-On (MPO) optical connector as defined for example in JIS C5982. As illustrated in FIG. 2, the optical connector body 10 includes a ferrule 11, a housing 12, a boot 13, and a coupling 14.

The ferrule 11 is a member that retains a leading end (front end) of optical fibers which are optical transmission paths. The ferrule 11 is provided within the housing 12 such that a portion of its leading end projects from the leading end of the housing 12 and such that front/rear movement is permitted. The ferrule 11 is provided with a plurality of optical fiber holes, and respective leading ends of optical fibers (bare fibers) are fixed respectively to the optical fiber holes.

The housing 12 is a member that retractably houses the ferrule 11. A spring (not illustrated) is provided in the interior space of the housing 12. The ferrule 11 is impelled frontward by the repulsive force of the spring in a state where a projection (not illustrated) provided on the housing 12 and a flange (not illustrated) of the ferrule 11 are engaged.

The boot 13 is provided rearward of the housing 12. The boot 13 includes a front part 13a, a rear part 13b, and a step part 13c.

The front part 13a is a fixing part for fixing the boot 13 to the housing 12.

The rear part 13b is a section that protects the optical cable, and is an elastically-deformable section made of a material having flexibility, such as rubber.

The step part 13c is a section between the front part 13a and the rear part 13b, and is formed so as to widen from the rear side (rear part 13b side) toward the front side (front part 13a side). The step part 13c is pressed by the push/pull member 20 at the time of attaching the optical connector.

The coupling 14 is a tubular member that is fitted onto the outside of the housing 12, and is provided slidably in the front/rear direction relative to the housing 12. At the time of removing the optical connector, unlatching is achieved by sliding the coupling 14 rearward relative to the housing 12.

The coupling 14 of the present embodiment is provided with long holes 15. The long hole 15 is a hole formed along the front/rear direction. Each of the left and right side surfaces of the coupling 14 has two long holes. The two long holes 15 in each of the right and left side surfaces are arranged vertically in the up/down direction. The two vertically-arranged long holes 15 are formed in positions where it is possible to avoid a spring 17 (cf. FIG. 3) that impels the coupling 14 frontward.

Each long hole 15 includes an insertion hole 15a, an engagement hole 15b, and a narrow part 15c.

The insertion hole 15a is a hole through which an inner projection 26 of an attachment 20B (described later) is inserted when the attachment 20B is attached to the coupling 14. The insertion hole 15a is located on the front side of the long hole 15. The insertion hole 15a is formed larger than the other sections of the long hole 15 (more specifically, formed in a size so that a head part 16a of the inner projection 26 of the attachment 20B is insertable).

The engagement hole 15b is a hole (engagement part) that engages with the inner projection 26 of the attachment 20B. The engagement hole 15b is located on the rear side of the long hole 15. The engagement hole 15b is formed smaller than the insertion hole 15a (more specifically, formed in a size so that a neck part 26b of the inner projection 26 is insertable but the head part 26a cannot pass therethrough). Thus, it is possible to prevent the inner projection 26 (stated differently, the attachment 20B) from getting detached. In the present embodiment, the coupling 14's engagement part (i.e., section that engages with the inner projection 26 of the attachment 20B of the push/pull member 20) is formed as a recess (a hole in this example) from the side surface of the coupling 14, and thus, there is no need to provide an engagement part that projects outward from the side surface of the coupling 14.

The narrow part 15c is arranged between the insertion hole 15a and the engagement hole 15b. The narrow part 15c is formed even smaller than the engagement hole 15b (more specifically, formed in a size that does not allow the neck part 26b of the inner projection 26 to move between the insertion hole 15a and the engagement hole 15b unless external force is applied). Thus, the inner projection 26 can be kept in the engagement hole 15b, and the inner projection 26 (the attachment 20B) can be prevented from getting detached.

The push/pull member 20 includes a main body part 20A and attachments 20B.

The main body part 20A is formed in a U-shape as viewed from above as illustrated in FIG. 2. The main body part 20A includes a connection part 21 and a pair of side wall parts 22. The main body part 20A is provided so as to be rotatable in a state where it engages with the coupling 14 via the attachments 20B.

The connection part 21 is a section that curvilinearly connects the pair of side wall parts 22, and is provided on the rear side of the push/pull member 20. A pull operation part 21a is provided on the inner surface of the connection part 21. The pull operation part 21a is a section that is operated (pulled) at the time of removing the optical connector, and as illustrated in FIGS. 1A and 1B, is arranged rearward of the boot 13 of the optical connector.

The side wall parts 22 are respectively arranged along the side surfaces (the right side surface and the left side surface) of the coupling 14. Each of the side wall parts 22 includes a push operation part 22a, a push part 22b, a pull part 22c, a long hole 23, and a sloped surface 24.

The push operation part 22a is a section (curved part) that is curved inward in each side wall part 22. The curved shape allows a user to easily pinch this part with his/her fingers. The push operation parts 22a are sections that are operated (pressed) at the time of attaching the optical connector.

The push parts 22b are sections for pushing the step part 13c of the boot 13 frontward, and are provided frontward of the respective push operation parts 22a and project inward from the respective side wall parts 22. The push parts 22b are arranged rearward of the step part 13c of the boot 13. The inner surface of the push parts 22b is shaped so as to conform to the outer shape of the boot 13 (i.e., the outer shape of the boundary section between the step part 13c and the rear part 13b). The distance between respective lower ends of the left and right push parts 22b is narrower than the boot 13's width in the left/right direction (i.e., the width of a section sandwiched between the pair of push parts 22b). Thus, the boot 13 is less likely to get detached from between the pair of push parts 22b.

The pull parts 22c are sections for pulling the coupling 14 of the optical connector body 10, and are provided frontward of the push parts 22b of the respective side wall parts 22. It should be noted that, in the present embodiment, the pull parts 22c pull the coupling 14 indirectly via the respective attachments 20B.

The long hole 23 is formed so as to be long in the front/rear direction in each pull part 22c. The long hole 23 includes an insertion hole 23a, an engagement hole 23b, and a narrow part 23c.

The insertion hole 23a is a hole through which an outer projection 27 of each attachment 20B is inserted when the main body part 20A is attached to the attachments 20B. The insertion hole 23a is located on the rear side of the long hole 23. The insertion hole 23a is formed relatively large (more specifically, formed in a size so that a head part 27a of the outer projection 27 of the attachment 20B is insertable).

The engagement hole 23b is a hole in which the outer projection 27 of the attachment 20B is caught, and is located on the front side of the long hole 23. The engagement hole 23b is formed smaller than the insertion hole 23a (more specifically, formed in a size so that a neck part 27b of the outer projection 27 of the attachment 20B is insertable but the head part 27a cannot pass therethrough). Thus, it is possible to prevent the outer projection 27 (the attachment 20B) from getting detached. Further, the engagement hole 23b is formed so as to be long in the front/rear direction. Thus, the outer projection 27 of the attachment 20B can move relatively in the front/rear direction (i.e., there is play).

The narrow part 23c is arranged between the insertion hole 23a and the engagement hole 23b. The narrow part 23c is formed even smaller than the engagement hole 23b (more specifically, formed in a size that does not allow the neck part 27b of the outer projection 27 to move between the insertion hole 23a and the engagement hole 23b unless external force is applied). Thus, the outer projection 27 can be kept in the engagement hole 23b, and the outer projection 27 (the attachment 20B) can be prevented from getting detached.

The sloped surface 24 is a section provided in a lower section between the push operation part 22a and the pull operation part 21a in each side wall part 22, and is formed as a slope wherein the side wall part 22's length in the up/down direction (i.e., the thickness) decreases toward the rear. The sloped surface 24 is a section that causes the push/pull member 20 to rise (rotate) upward when the rear part 13b of the boot 13, or the cable, extending out from the rear side of the optical connector body 10 gets bent in the left/right direction. More specifically, when the rear part of the boot 13 or the cable gets bent and comes into contact with the sloped surface 24, the boot 13's rear part or the cable slides along the sloped surface 24 to cause the push/pull member 20 to rise upward.

The attachment 20B is a member for attaching the main body part 20A of the push/pull member 20 to the coupling 14. One attachment 20B is arranged on each of the left and right side parts of the coupling 14. Each attachment 20B includes a side plate part 25, inner projection(s) 26, and an outer projection 27.

The side plate part 25 is a member that is attached to the side part of the coupling 14. The inner surface of the side plate part 25 is shaped so as to conform to the outer shape of the side part of the coupling 14.

The inner projection 26 is a section for engagement with the coupling 14. The inner projection 26 projects inward from the inner surface of the side plate part 25. The side plate part 25 has two inner projections 26 arranged vertically in the up/down direction. The two upper and lower inner projections 26 respectively correspond to the two upper and lower long holes 15 in the side surface of the coupling 14. The reason why two inner projections 26 are provided vertically is to avoid the spring 17 (cf. FIG. 3) that impels the coupling 14 frontward and also to maintain balance at the time of removing (pulling) the optical connector. Each inner projection 26 includes a head part 26a and a neck part 26b.

The head part 26a is an end part (inner end part) of the inner projection 26. The head part 26a is insertable through the insertion hole 15a of the coupling 14 (i.e., the head part 26a is smaller than the insertion hole 15a of the coupling 14). On the other hand, the head part 26a cannot be inserted through the engagement hole 15b of the coupling 14 (i.e., the head part 26a is larger than the engagement hole 15b of the coupling 14).

The neck part 26b is a section between the head part 26a and the side plate part 25. The neck part 26b is narrower (smaller) than the head part 26a. Thus, the neck part 26b can pass through the engagement hole 15b of the coupling 14.

The outer projection 27 is a section for engagement with the main body part 20A of the push/pull member 20. The outer projection 27 projects outward from the outer surface of the side plate part 25. The outer projection 27 includes a head part 27a and a neck part 27b.

The head part 27a is an end part (outer end part) of the outer projection. The head part 27a is insertable through the insertion hole 23a of the main body part 20A (i.e., the head part 27a is smaller than the insertion hole 23a of the main body part 20A). On the other hand, the head part 27a cannot be inserted through the engagement hole 23b of the main body part 20A (i.e., the head part 27a is larger than the engagement hole 23b of the main body part 20A).

The neck part 27b is a section between the head part 27a and the side plate part 25. The neck part 27b is narrower (smaller) than the head part 27a. Thus, the neck part 27b can pass through the engagement hole 23b of the main body part 20A.

{Method for Attaching/Detaching Push/Pull Member}

Figure 4A:
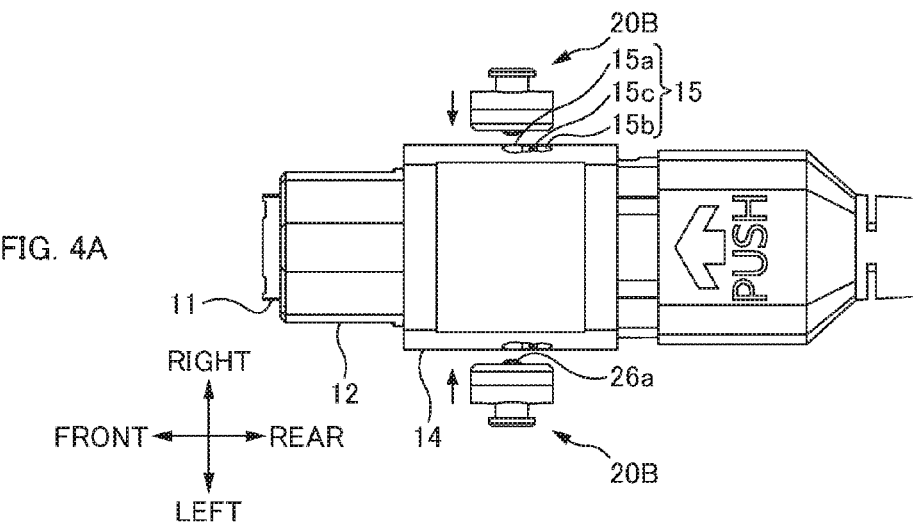
FIGS. 4A to 4C are diagrams illustrating a method for attaching the attachment 20B.
Figure 4B:
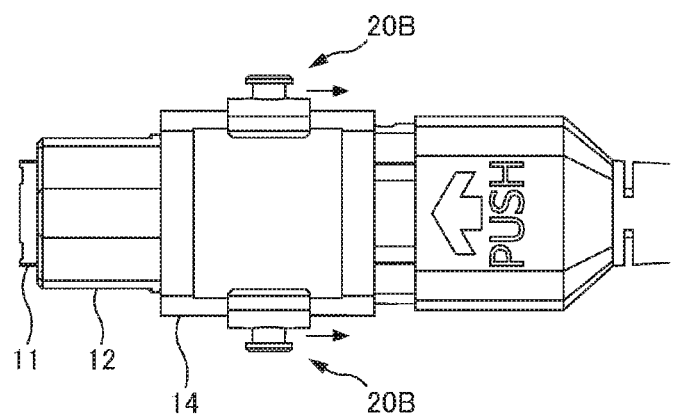
Figure 4C:
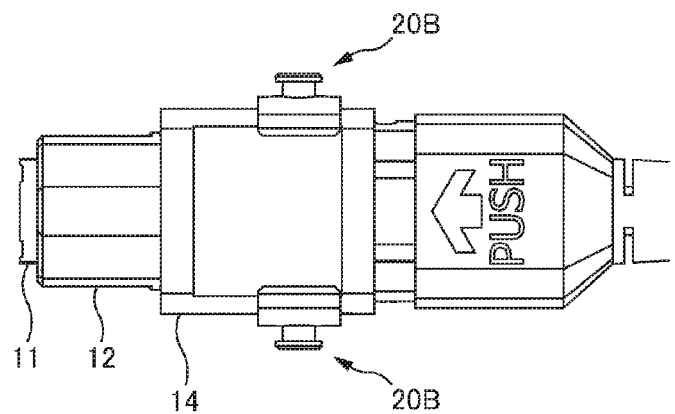

Method for Attaching Attachment 20B:

FIGS. 4A to 4C are diagrams illustrating a method for attaching the attachments 20B. It should be noted that, in the figures, the attachments 20B are attached simultaneously to the respective side surfaces (left and right side surfaces) of the coupling 14 of the optical connector body 10, but the left and right attachments may be attached separately.

First, as illustrated in FIG. 4A, a user positions the head part 26a of the inner projection 26 of each attachment 20B at the respective long hole 15 (in this example, the insertion hole 15a) of the coupling 14. Then, the head part 26a of the inner projection 26 of each attachment 20B is inserted into the respective insertion hole 15a of the coupling 14.

Next, as illustrated in FIG. 4B, the user relatively moves each attachment 20B rearward relative to the coupling 14. As a result, the neck part 26b of the inner projection 26 of each attachment 20B moves from the insertion hole 15a of each long hole 15 of the coupling 14 to the engagement hole 15b via the narrow part 15c, as illustrated in FIG. 4C. The engagement hole 15b is of a size through which the head part 26a of the inner projection 26 cannot pass, and also, the narrow part 15c is located on the front side of the neck part 26b; thus, the inner projection 26 (the attachment 20B) can be prevented from getting detached. In this way, the attachments 20B are attached to the coupling 14 of the optical connector body 10.

Method for Attaching Main Body Part 20A:

FIGS. 5A to 5D are diagrams illustrating a method for attaching the main body part 20A. It should be noted that the main body part 20A is attached after the attachments 20B are attached (FIGS. 4A to 4C).

Figure 5A:
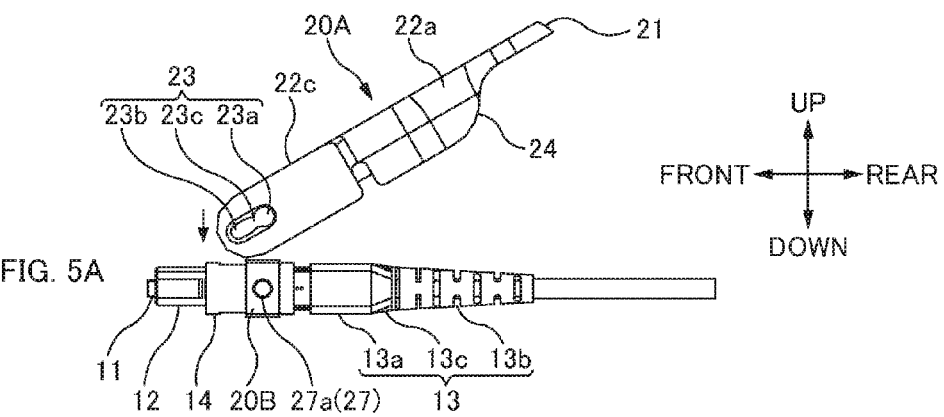
FIGS. 5A to 5D are diagrams illustrating a method for attaching a main body part 20A.

First, as illustrated in FIG. 5A, the user arranges the main body part 20A above the optical connector body 10, to which the attachments 20B have been attached. At this time, the main body part 20A is arranged in an inclined manner so that the front end of the main body part 20A is tilted downward, as illustrated in the figure. The main body part 20A is arranged in an inclined manner in order to prevent the push parts 22b of the main body part 20A from contacting the boot 13 and getting in the way when the outer projections 27 of the respective attachments 20B are inserted into the respective long holes 23 of the main body part 20A in the next step.

Figure 5B:
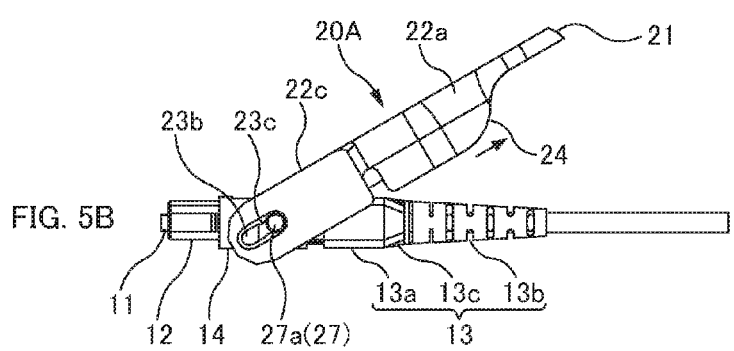

Next, as illustrated in FIG. 5B, the user inserts the head part 27a of the outer projection 27 of each attachment 20B into the insertion hole 23a of the long hole 23 of the respective pull part 22c while causing the pull parts 22c of the respective side wall parts 22 of the main body part 20A to open outward. It should be noted that, at this stage, if the connection part 21 of the main body part 20A is pressed downward and the main body part 20A is rotated by employing the outer projections 27 as an axis, the push parts 22b of the main body part 20A will come into contact with the front part 13a of the boot 13 and the push parts 22b cannot be arranged on the rear side of the step part 13c of the boot 13.

After inserting the outer projections 27 of the respective attachments 20B respectively into the long holes 23 of the main body part 20A, the user pulls the main body part 20A in a direction along the long holes 23 (diagonally upward toward the rear in this example), as illustrated by the arrow in FIG. 5B. As a result, the outer projection 27 (the neck part 27b) of each attachment 20B moves from the insertion hole 23a of the long hole 23 of the main body part 20A to the engagement hole 23b via the narrow part 23c, as illustrated in FIG. 5C.

Figure 5C:
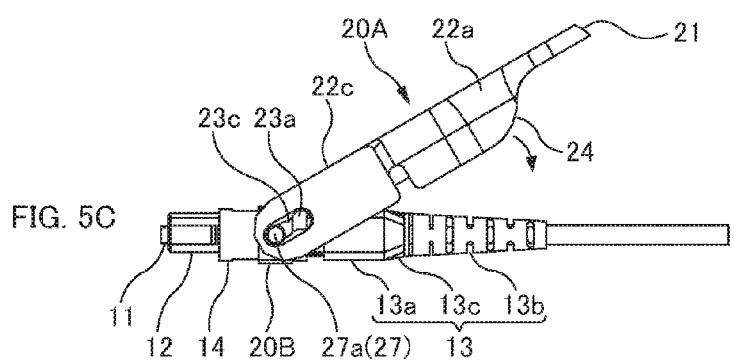

Next, the user presses the connection part 21 of the main body part 20A downward and rotates the main body part 20A by employing the outer projections 27 as an axis, as illustrated by the arrow in FIG. 5C. As a result, the push parts 22b of the main body part 20A are arranged on the rear side of the step part 13c of the boot 13. It should be noted that, because the connection part 21 of the main body part 20A is pressed downward as illustrated by the arrow in FIG. 5C after pulling the main body part 20A diagonally rearward as illustrated by the arrow in FIG. 5B, the push parts 22b of the main body part 20A can be arranged on the rear side of the step part 13c of the boot 13 without causing the push parts 22b of the main body part 20A to collide against the boot 13's front part 13a.

Figure 5D:
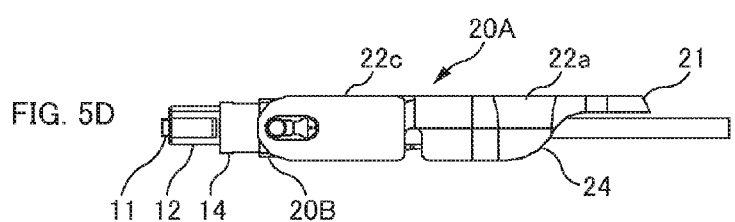

It should be noted that the distance between respective lower ends of the left and right push parts 22b is narrower than the boot 13's width in the left/right direction; so, when the main body part moves from the state of FIG. 5C to the state of FIG. 5D: the lower end of the respective push parts 22b contacts the boot 13 and the pair of side wall parts 22 elastically deforms along the outer shape of the boot 13 such that the distance between the push parts 22b widens outward; then, the lower end of the respective push parts 22b enters the lower side of the boot 13; and thereafter the side wall parts 22 return to their original shape. Thus, in the state of FIG. 5D, the boot 13 is less likely to get detached from between the pair of push parts 22b. Further, in the stage illustrated in FIG. 5C, the head part 27a of the outer projection 27 of each attachment 20B holds down a section in the vicinity of the long hole 23 of each side wall part 22; so, when the main body part moves from the state of FIG. 5C to the state of FIG. 5D, the main body part 20A does not get detached from the attachments 20B even when the pair of side wall parts 22 elastically deforms such that the distance between the push parts 22b widens outward.

In this way, the main body part 20A is attached to the optical connector as illustrated in FIG. 5D.

How to Remove Push/Pull Member 20:

The push/pull member 20 is removed according to the opposite procedure from when it is attached.

First, the user lifts the rear side (e.g. the connection part 21) of the main body part 20A upward from the state of FIG. 5D, and rotates the main body part 20A by employing the outer projections 27 as an axis (cf. FIG. 5C). As a result, the boot 13 disengages from between the pair of push parts 22b, and the main body part 20B becomes movable relative to the attachments 20B in the direction along the long holes 23. Next, the user presses the main body part 20A in the direction along the long holes 23 (diagonally downward toward the front in this example), as illustrated by the arrow in FIG. 5B. As a result, the outer projection 27 (the neck part 27b) of each attachment 20B moves from the engagement hole 23b to the insertion hole 23a via the narrow part 23c (cf. FIG. 5B). Then, the user opens the pull parts 22c of the respective side wall parts 22 of the main body part 20A outward, and retracts the outer projection 27 (head part 27a) of each attachment 20B from the insertion hole 23a of the long hole 23 of each pull part 22c. In this way, the main body part 20A is removed from the optical connector (attachments 20B) (FIG. 5A).

It should be noted that, in the present embodiment, in the state of FIG. 5D (in a state where the push parts 22b are arranged on the rear side of the boot 13's step part 13c), the main body part 20A cannot be removed because, even if the user attempts to move the main body part 20A frontward relative to the attachments 20B, the push parts 22b of the main body part 20A contact the step part 13c of the boot 13 before the outer projection 27 of each attachment 20B reaches the insertion hole 23a of the long hole 23. Further, in the present embodiment, in the state of FIG. 5D, the outer projection 27 (head part 27a) of each attachment 20B cannot be detached from the long hole 23 of each pull part 22c because, even when the user attempts to open the pull parts 22c of the respective side wall parts 22 of the main body part 20A outward, a section in the vicinity of the long hole 23 of each side wall part 22 is held down by the head part 27a of the outer projection 27 of each attachment 20B. Thus, in the present embodiment, it is possible to prevent inadvertent removal of the main body part 20A.

Next, the user relatively moves each attachment 20B frontward relative to the coupling 14 from the state of FIG. 4C. As a result, the neck part 26b of the inner projection 26 of each attachment 20B moves from the engagement hole 15b of the long hole 15 of the coupling 14 to the insertion hole 15a via the narrow part 15c, as illustrated in FIG. 4B. Thereafter, the user pulls the neck part 26b of the inner projection 26 of each attachment 20B from the insertion hole 15a. In this way, the attachments 20B are removed from the coupling 14 of the optical connector, as illustrated in FIG. 4A.

It should be noted that, in the present embodiment, in the state illustrated in FIG. 4C, the attachments 20B cannot be detached from the coupling 14 because, even when the user attempts to pull the attachments 20B outward respectively toward the left and right from the coupling 14, the head part 26a of the inner projection 26 of each attachment 20B gets caught. Thus, in the present embodiment, it is possible to prevent inadvertent removal of the attachments 20B (or the push/pull member 20) from the coupling.

{How to Use Push/Pull Member 20}

Figure 6A:
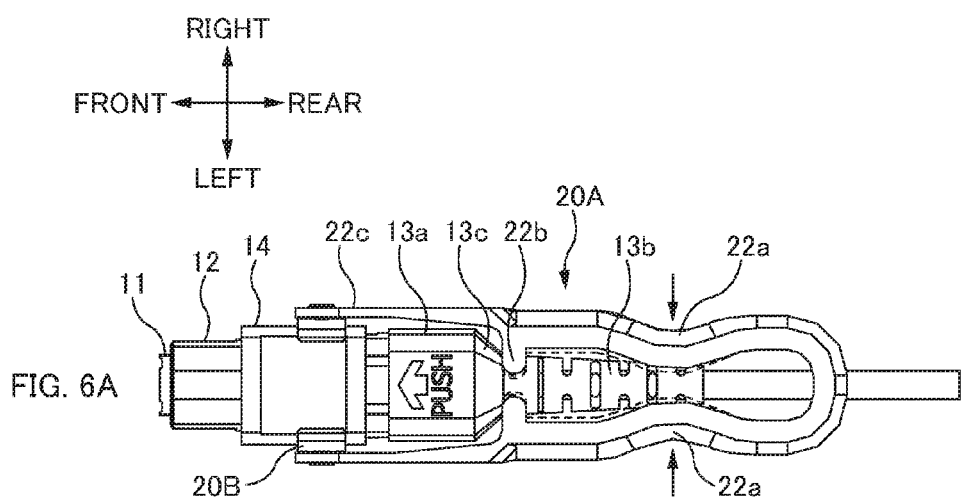
FIGS. 6A and 6B are diagrams illustrating a method for attaching the optical connector.
Figure 6B:
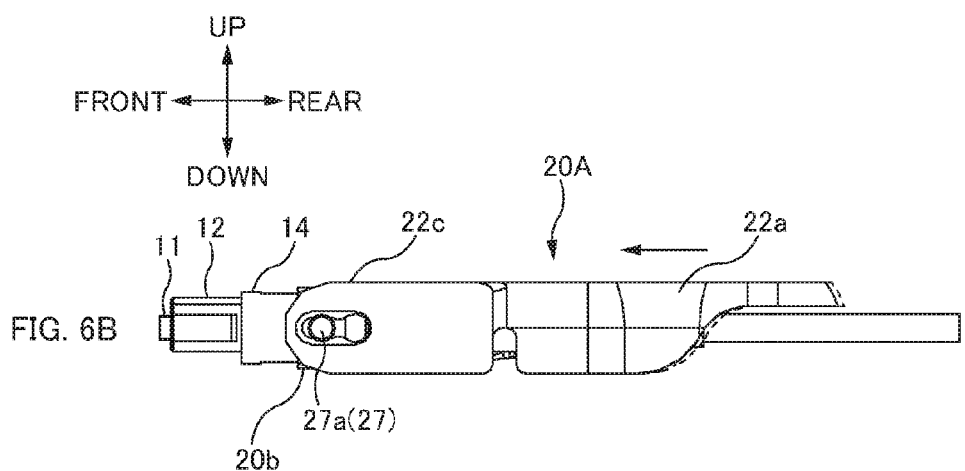

When Attaching Optical Connector (when Pushing):

FIGS. 6A and 6B are diagrams illustrating a method for attaching the optical connector.

In a state where the push/pull member 20 is attached to the optical connector, a user pinches the push operation parts 22a (the curved parts of the respective side wall parts 22) with, for example, his/her thumb and index finger (cf. FIG. 6A). At this time, if the user puts strength in his/her thumb and index finger, the push operation parts 22a are pressed inward and the pair of side wall parts 22 of the main body part 20A deforms inward, causing the push parts 22b to approach one another. Thus, the push parts 22b can easily press the step part 13c of the boot 13 from the rear.

Then, while holding (pinching) the push operation parts 22a, the user presses-in the optical connector frontward toward an adapter (cf. FIG. 6B). It should be noted that the main body part 20A of the push/pull member 20 is allowed to move slightly frontward relative to the optical connector body 10. This is because the engagement hole 23b of the main body part 20A is long in the front/rear direction and there is play. By pressing the optical connector while holding the push operation parts 22a, the push parts 22b contact the step part 13c of the boot 13, and the optical connector body 10 can be pressed frontward via the boot 13. In this way, the optical connector body 10 is attached to an adapter. As described above, in the present embodiment, the push operation parts 22a (curved parts) are provided rearward of the boot 13, and thus, the push operation parts can be easily pinched and pressed at the time of pressing-in the optical connector. Thus, the optical connector can be attached easily.

When Removing Optical Connector (when Pulling):

A user hooks the pull operation part 21a (the inner surface of the connection part 21) with, for example, his/her index finger, and pulls the main body part 20A rearward. In this way, the front edge of each engagement hole 23b of the main body part 20A engages with the outer projection 27 (neck part 27b) of the respective attachment 20B, and the attachments 20B are pulled rearward. Further, the inner projection 26 (neck part 26b) of each attachment 20B engages with the rear edge of the respective engagement hole 15b of the coupling 14, and the coupling 14 is pulled rearward. As a result, the coupling 14 slides rearward relative to the housing 12, and the optical connector is unlatched. As described above, in the present embodiment, the pull operation part 21a simply needs to be pulled at the time of removing the optical connector and the user does not need to pinch the optical connector with his/her fingers, and thus, the optical connector can be removed easily. Further, because the pull operation part 21a is provided to a section connecting the pair of side wall parts 22 (i.e., the connection part 21), force can be applied evenly to both the left and right sides (the force does not become unbalanced).

If the push/pull member 20 is not provided, the boot 13 will need to be pinched and pressed frontward at the time of attaching the optical connector, and on the other hand, the coupling 14 will need to be pinched and pulled rearward at the time of removing the optical connector. Stated differently, the parts to be operated will be different at the time of attaching and removing the optical connector. In contrast, by providing the push/pull member 20, the same push/pull member 20 can be operated both at the time of attaching and removing the optical connector.

SUMMARY

The optical connector of the present embodiment includes: an optical connector body 10 including a housing 12 and a coupling 14; and a push/pull member 20 (corresponding to the pull member) including a pull operation part 21a that is located rearward of the coupling 14. The push/pull member 20 (which is constituted by the main body part 20A and the attachments 20B) includes a pair of side plate parts 25 to be respectively arranged along the side surfaces of the coupling 14, and each of the side plate parts 25 includes an inner projection 26. The coupling 14 includes an engagement hole 15b, which is a recessed engagement part, and the inner projection 26 of the push/pull member 20 engages with the engagement hole 15b of the coupling 14. When the pull operation part 21a of the push/pull member 20 is pulled rearward, the coupling 14 is moved rearward relative to the housing 12 by the inner projection 26, and thereby, the optical connector body 10 can be unlatched. According to the present embodiment, there is no need to form an outwardly-projecting part on the side surface of the coupling 14.

In the present embodiment, the pull operation part 21a is arranged rearward of the boot 13. In this way, the user's finger can easily reach the pull operation part 21a, and the optical connector body 10 can be unlatched easily by pulling the pull operation part 21a, even in cases where optical connectors are installed at high densities.

In the present embodiment: the push/pull member 20 is constituted by a main body part 20A and attachments 20B; and the main body part 20A engages with the engagement part (engagement holes 15b) of the coupling 14 via the attachments 20B. Thus, according to the present embodiment, the main body part 20A—to which the pull operation part 21a is provided—and the attachments 20B—to which the side plate parts 25 and the respective inner projections 26—are provided can be constructed separately, and the push/pull member 20 can be attached easily.

In the present embodiment: each of the side wall parts 22 of the main body part 20B includes a push part 22b; and the respective push parts 22b are arranged rearward of the step part 13c of the boot 13. In this way, the boot 13 can be pressed from the rear with the push parts 22b by pressing-in the main body part 20b frontward at the time of connecting the optical connector, and thus, the optical connector can be connected with a counterpart optical connector or adapter. Further, by providing the push/pull member 20 with not only the function as a pull member but also the function as a push member, the optical connector can be attached and detached by operating the same member (the push/pull member 20), which makes the task of attaching/detaching the optical connector easy to understand.

In the present embodiment: the attachment 20B includes outer projections 27; and each of the side wall parts 22 of the main body part 20A includes an engagement hole 23b that engages with the respective outer projection 27. Thus, by rotating the main body part 20A by employing the outer projections 27 as an axis, the boot 13 can be disengaged from the push parts 22b arranged rearward of the step part 13c of the boot 13.

In the present embodiment: each of the outer projections 27 includes a head part 27a that cannot pass through the engagement hole 23b, and a neck part 27b that is provided between the head part 27a and the side plate part 25, is narrower than the head part 27a, and can pass through the engagement hole 23b; and each of the side wall parts 22 includes a long hole 23 constituted by the engagement hole 23b through which the head part 27 cannot be inserted, and an insertion hole 23a through which the head part 27a is insertable. Further, in the state of FIG. 5D (in a state where the push parts 22b are arranged rearward of the step part 13c of the boot 13), due to contact between the push parts 22b and the step part 13c of the boot 13, the main body part 20A cannot be moved relative to the attachment 20B up to a position where the outer projection 27 reaches the insertion hole 23a. Thus, it is possible to prevent inadvertent removal of the main body part 20A. On the other hand, when the main body part 20A is rotated by employing the outer projections 27 as an axis and the boot 13 disengages from the push parts 22b, the main body part 20A becomes movable relative to the attachment 20B up to a position where the outer projection 27 reaches the insertion hole 23a. Thus, the main body part 20A can be disengaged from the outer projections 27 of the respective attachments 20B.

In the present embodiment: each of the side wall parts 22 is provided with a sloped surface 24; and when the rear part of the boot 13 or the cable gets bent, the boot or the cable comes into contact with the sloped surface 24 and the main body part 20B is lifted and rotated. In this way, the main body part 20B can move away from the cable when the cable gets bent, and the cable can be prevented from being subjected to excessive load.

In the present embodiment, as illustrated in FIG. 6A, when the pair of side wall parts 22 is pressed inward, the side wall parts 22 elastically deform and the distance between the push parts 22b can be reduced. In this way, the boot 13 can be pressed easily from the rear by the push parts 22b at the time of connecting the optical connector.

Other Embodiments

The foregoing embodiment is for facilitating the understanding of the invention, and is not to be construed as limiting the invention. The invention can be modified and improved without departing from the gist thereof, and, needless to say, the invention encompasses equivalents thereof.

In the push/pull member 20 of the foregoing embodiment, the main body part 20A and the attachments 20B are separate members, but the main body part and the attachment may be formed integrally. For example, inner projections insertable into the respective long holes 15 of the coupling 14 may be provided on the respective inner surfaces of the pair of side wall parts (side plate parts) of a U-shaped push/pull member.

In the foregoing embodiment, a long hole 15 that engages with the inner projection 26 is formed in each side surface of the coupling 14. However, a recess (engagement part) that engages with the inner projection 26 may be formed instead of forming a hole. Moreover, the inner projections 26 may engage with (may be fitted and fixed to) the engagement part without moving the inner projections 26 in the front/rear direction.

Further, in the foregoing embodiment, the push/pull member 20 is provided with both functions as a push member and a pull member. However, the push/pull member may be separated into two members, i.e., a push member and a pull member. In this case, it is only necessary to provide at least the pull member (and the push member is optional).

REFERENCE SIGNS LIST

10: Optical connector body;
11: Ferrule;
12: Housing;
13: Boot;
13a: Front part;
13b: Rear part;
13c: Step part;
14: Coupling;
15: Long hole;
15a: Insertion hole;
15b: Engagement hole;
15c: Narrow part;

20: Push/pull member;
20A: Main body part;
20B: Attachment;
21: Connection part;
21a: Pull operation part;
22: Side wall part;
22a: Push operation part;
22b: Push part;
22c: Pull part;
23: Long hole;
23a: Insertion hole;
23b: Engagement hole;
23c: Narrow part;
24: Sloped surface;
25: Side plate part;
26: Inner projection;
26a: Head part;
26b: Neck part;
27: Outer projection;
27a: Head part;
27b: Neck part.

The invention claimed is:

1. An optical connector comprising:
an optical connector body including:
  a housing that houses a ferrule, and
  a coupling that is movable relative to the housing, wherein
  the optical connector body releases a latched state by moving the coupling rearward relative to the housing; and
a pull member including a pull operation part that is located rearward of the coupling, wherein:
the pull member includes a pair of side plate parts to be respectively arranged along side surfaces of the coupling;
each of the side plate parts includes an inner projection that projects inward from an inner surface;
the coupling includes a recessed engagement part;
the inner projection of the pull member engages with the engagement part of the coupling;
when the pull operation part of the pull member is pulled rearward, the coupling is moved rearward relative to the housing by the inner projection of the pull member;
the pull member includes:
  a main body part to which the pull operation part is provided, and
  an attachment to which the side plate parts and the respective inner projections are provided;
the main body part engages with the engagement part of the coupling via the attachment;
the main body part includes a pair of side wall parts;
each of the side wall parts includes a push part that projects inward; and
the respective push parts are arranged rearward of a step part of a boot that is arranged rearward of the housing of the optical connector body.

2. The optical connector according to claim 1, wherein:
the attachment includes outer projections that project outward;
each of the side wall parts of the main body part includes an engagement hole that engages with the respective outer projection; and
when the main body part is rotated by employing the outer projections as an axis, the boot disengages from the push parts arranged rearward of the step part of the boot.

3. The optical connector according to claim 2, wherein:
each of the outer projections includes
a head part that cannot pass through the engagement hole, and
a neck part that is provided between the head part and the side plate part, is narrower than the head part, and can pass through the engagement hole;
each of the side wall parts includes a long hole including said engagement hole and an insertion hole through which the head part is insertable;
the neck part of each outer projection is located within the engagement hole in a state where the push parts are arranged rearward of the step part of the boot, and due to contact between the push parts and the step part, the main body part cannot be moved relative to the attachment up to a position where the outer projection reaches the insertion hole; and
when the main body part is rotated by employing the outer projections as an axis and the boot disengages from the push parts, the main body part becomes movable relative to the attachment up to a position where the outer projection reaches the insertion hole.

4. The optical connector according to claim 2, wherein:
each of the side wall parts is provided with a sloped surface; and
when a cable extending out from the optical connector body gets bent, the cable or the boot comes into contact with the sloped surface and the main body part rotates.

5. The optical connector according to claim 1, wherein, when the pair of side wall parts is pressed inward, the side wall parts elastically deform and the distance between the push parts is reduced.

6. An optical connector comprising:
an optical connector body including:
  a housing that houses a ferrule, and
  a coupling that is movable relative to the housing, wherein
  the optical connector body is attached by being moved frontward, and releases a latched state by moving the coupling rearward relative to the housing;
an attachment that includes a pair of side plate parts to be respectively attached to side surfaces of the coupling; and
a main body part including:
  a pull operation part operated when pulling the coupling rearward via the attachment, and
  a push part that presses the optical connector body frontward at the time of push operation;
each of the side plate parts of the attachment includes an inner projection that projects inward from an inner surface;
the coupling includes a recessed engagement part; and
the attachment is attached to the coupling by causing the attachment's inner projection to engage with the engagement part of the coupling.

7. The optical connector according to claim 6, wherein the pull operation part is arranged rearward of a boot that is arranged rearward of the housing of the optical connector body.

* * * * *